Sept. 22, 1970     W. K. McOSKER ETAL     3,529,451
HELMET LOCK
Filed Aug. 7, 1968     2 Sheets-Sheet 2
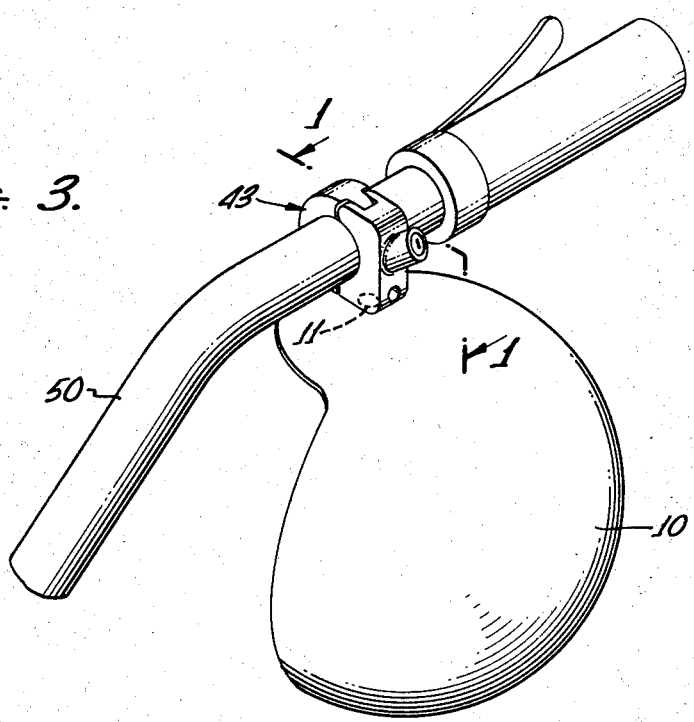
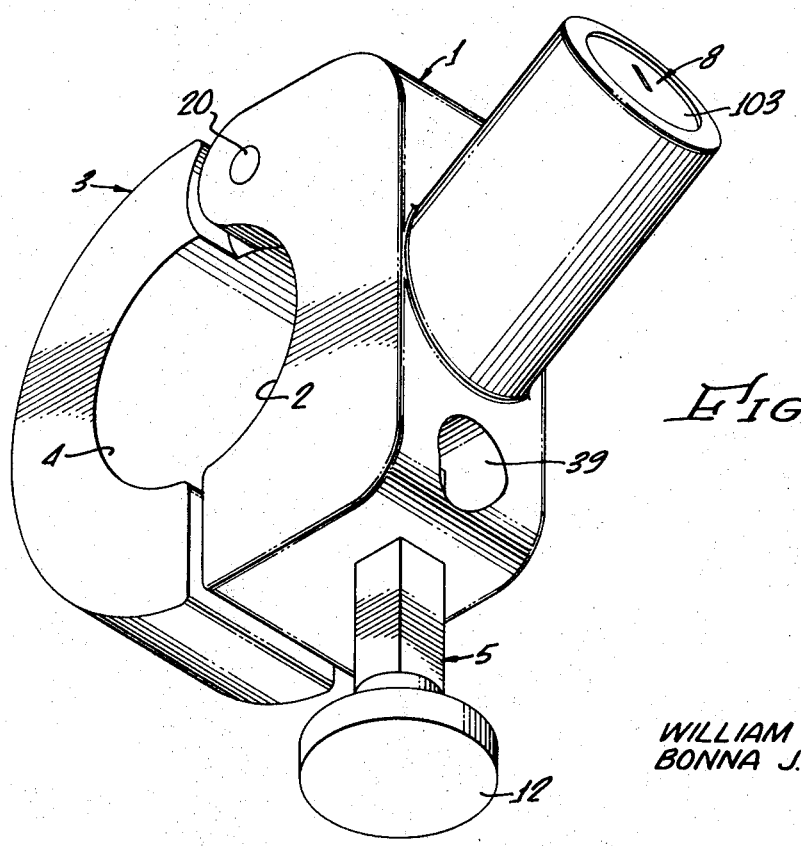
INVENTORS.
WILLIAM K. McOSKER
BONNA J. JIMERSON

United States Patent Office 3,529,451
Patented Sept. 22, 1970

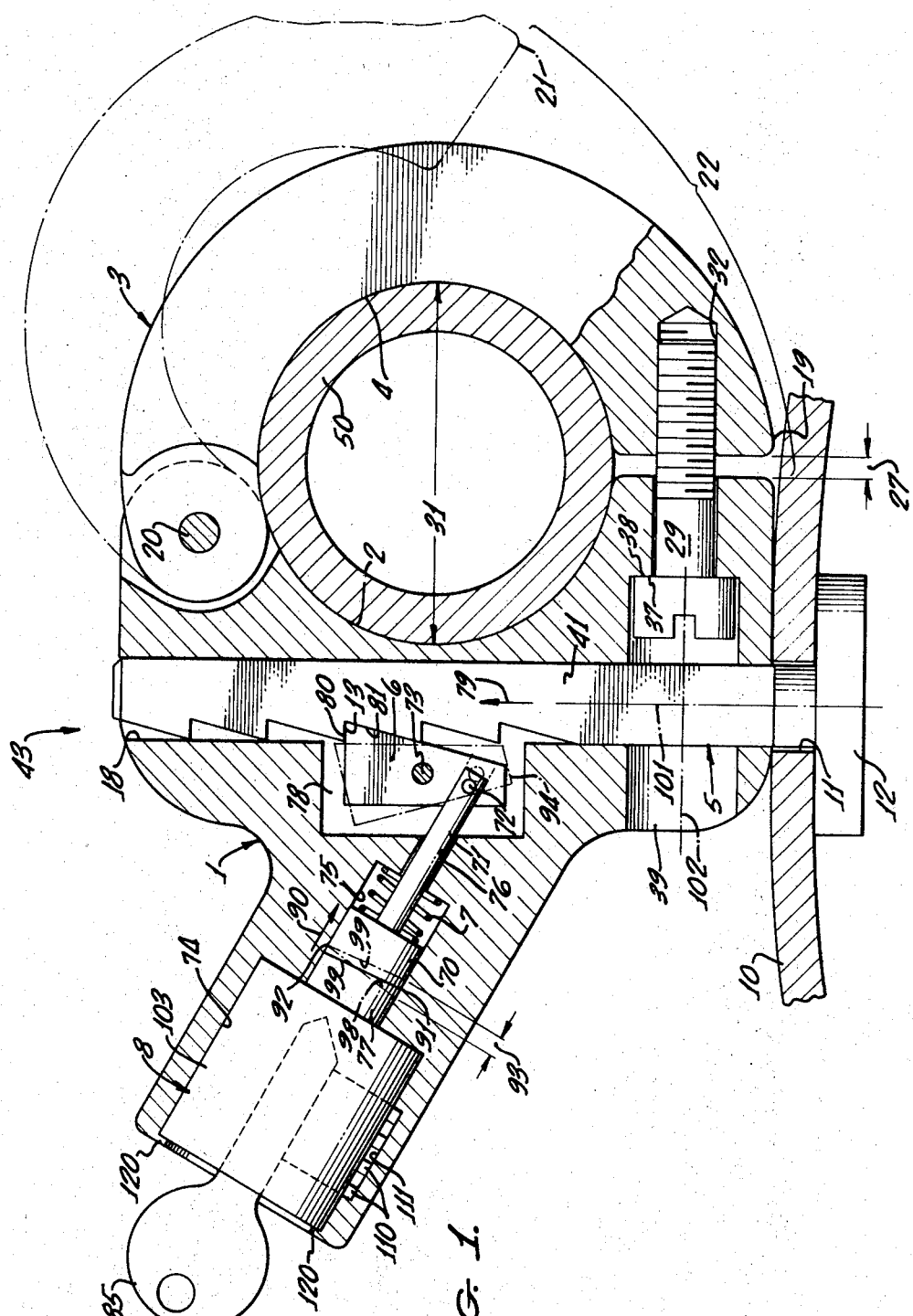

3,529,451
HELMET LOCK
William K. McOsker, 1821 Vallecito Drive, and Bonna J. Jimerson, 1815 Vallecito Drive, both of Eastview, Calif. 90732
Filed Aug. 7, 1968, Ser. No. 750,972
Int. Cl. E05b 69/00; A42b 3/00
U.S. Cl. 70—59                     12 Claims

ABSTRACT OF THE DISCLOSURE

Safety helmets may be locked to an open vehicle to prevent their theft during an owner's temporary absence. The securing of such headgear may be achieved by a locking unit which is attached to the vehicle to preclude removal of both lock and helmet. This combined function may be accomplished with a ratchet shanked pin, the head of which functions to prohibit the helmet removal, and the shank of which acts to prohibit access to the locking unit clamp when inserted in a ratchet cylinder on the locking unit.

BACKGROUND OF THE INVENTION

Hard-shelled helmets are frequently used by the operators of open vehicles such as motorcycles and motor-scooters to provide protection against head injuries. The wearing of such protective headgear is even made a mandatory requirement for the operation of such vehicles on public streets in many states. Most of the helmets in common usage are of a multiple layer fiber glass construction weighing several pounds. Because of their weight and bulk size, such helmets cannot be conveniently carried while the operator is on foot. On the other hand, because of the more than trivial cost of such headpieces (typical units retail in the neighborhood of $40 and because of the large number of thefts associated therewith, it is extremely unadvisable to leave such headgear unattended. What is actually desired is a means of securely appending the headgear to the vehicle so as to prevent the headgear from being stolen during temporary absence of the operator. Furthermore, the protective device must itself be of a configuration that will preclude its being stolen while in use or not in use. In addition, the protective mechanism should be arranged to provide a secure and yet detachable mounting of the helmet to the vehicle without requiring costly modification of either.

Accordingly, it is an object of the present invention to provide an apparatus for attaching and locking a crash helmet or other protective headgear to a motorcycle or other open vehicle so as to prevent the theft of such headgear while unguarded by the operator.

It is another object of the invention to provide a device for attaching a protective headgear to an open vehicle which may itself be interlocked with said vehicle to prevent the removal by unauthorized persons of (1) both headgear and locking device when the headgear is attached by said locking device, and (2) the locking device alone when it is not being used to attach a headgear.

It is a further object of the invention to provide a locking device for securing a protective helmet to an open vehicle which does not require extensive alteration of either vehicle or helmet.

Other objects and advantages of the present invention will become apparent from the description of a particular embodiment given hereinbelow.

SUMMARY OF THE INVENTION

The helmet lock described herein comprises a lock assembly having an opening adapted to hold a removeable ratchet shanked pin and an adjustable clamping mechanism for securely attaching the lock assembly to the handlebars or some other structural member of an open vehicle. In a typical application, the helmet is modified to have a small hole near its outer periphery of sufficient size to pass only the pin shank (and not the head) therethrough. Detachable mounting of the helmet to the vehicle is accomplished by passing the pin shank first through the helmet hole and then inserting it in the lock assembly aperture. With the ratchet pin thus positioned, access to the clamp mounting is obstructed so as to preclude removal of the lock assembly from the vehicle. With the lock assembly in the "lock" state, removal of the ratchet pin from the aperture is precluded by a ratchet stop which functions in combination with the ratchet pin in accordance with the usual operation of ratchets, i.e., that of permitting motion in one direction but not in another. In this, the locked state, the head of the pin thus prevents removal of the helmet from the locking device while the shank of the pin prevents removal of the locking device from the vehicle.

BRIEF DESCRIPTION OF THE DRAWINGS

FIG. 1 is a cross-section illustrating the operative components of the locking device.

FIG. 2 is a perspective view of the locking device showing how the partially inserted ratchet pin blocks access to the clamp tightening screw.

FIG. 3 shows the locking device suspending a helmet from the handlebar of a motorcycle.

DESCRIPTION OF A PREFERRED EMBODIMENT

According to the drawings, and referring particularly to FIG. 1, the basic locking device 43 includes a casing 1, having a concave recessed face 2, forming a clamp cheek, a pivotally connected arm 3 also having a concave recessed face 4, forming a second clamp cheek, a ratchet stop 6 and a spring 7 for biasing the ratchet stop 6 to engage the teeth 13 of a ratchet shanked pin 5. The casing is formed in the shape of a Y so that the key lock mechanism 8 is conveniently accessible to the operator when the helmet is in the locked position as evidenced by the drawings. The fastening of the helmet to the locking device 43 is effectuated by the ratchet shanked pin 5 which may be freely inserted into the square hole 18. Withdrawal of the pin 5, however, is prevented by the ratchet stop 6 which may be released only by the locking unit 8 as explained below. The structural material for the casing 1, pivot arm 3, and ratchet shanked pin 5 is typically a rust resistant steel, although it is understood that any hard and durable substance might be used.

Attachment of the lock to the vehicle is accomplished by rotating the arm 3 about the pivot pin 20 to the dotted position 21 so as to accommodate passage of a handlebar (or other structural member having a circular cross section) through the large gap 22. Once positioned, the arm 3 may be pivoted to its original position 19 so as to leave the handlebar 50 occupying the area between the concave recesses 2 and 4. This is illustrated in FIG. 3, which shows the locking device 43 mounted on a handlebar 50. Referring again to FIG. 1, the radii of the concave recesses defining the claimp cheeks 2 and 4 are approximately equal to that of a standard handlebar so that when the small gap 27 is decreased, the clamp cheeks 2 and 4 approximate a circle whose diameter 31 is slightly less than that of the handlebars. Secure attachment of the locking device to the handlebars is thus effectuated by tightening the mounting bolt 29 in the threaded hole, which results in a decrease in the size of the small gap 27 thus causing the cheeks of the clamp, i.e. the recessed faces 2 and 4, to exert a uniform pressure on the handlebar. FIG. 1 shows how the small gap 27 is taken up as the shoulders 38 of the mounting bolt 29 come into contact with the shouldered rim 37 of the mounting hole. In actual practice, the mounting bolt 29 is tightened somewhat firmly so as to prevent rotation of the locking mechanism under the normal stresses encountered in the operation of such vehicles. The clamp cheeks may, of course, be manufactured to various radii so as to accommodate a wide variety of vehicles having different size handlebars and structural parts. Alternatively, an annular shaped insert may be used to adapt the cheeks of a clamp to fit a smaller structure.

Once the lock has been secured to the vehicle, the helmet 10 may be demountably attached thereto using the ratchet pin 5. In the preferred embodiment of the invention shown in FIG. 3, the helmet has a small hole 11 through which the shank 41 of the ratchet pin 5 is inserted. The helmet 10 is thus suspended from underneath the locking device 43 by the ratchet pin 5, the head 12 of which is considerably larger than the helmet hole 11. Referring again to FIG. 1, it will be understood that removal of the ratchet pin 5 from the square hole 18 is prevented by the ratchet stop 6 which is biased by the spring 7 so as to engage the ratchet shoulder 13. The shank 41 of course may be advanced into the cylindrical hole as far as is necessary to bring the helmet 10 into firm contact with the locking device 43.

For the mounting configuration shown in FIG. 3, it will be seen that the helmet is adapted to have a small hole 11 near its outer periphery, this being a preferred location as opposed to the crown or some other area where a hole might conceiveably weaken the helmet structure. The size of the hole naturally depends upon the size of the ratchet shank which would typically be on the order of ¼" to ⅜". Certain style helmets also employ ear protective coverings, some models of which contain openings through which the ratchet pin could be passed without any modification of the helmet.

Referring again to the preferred embodiment shown in FIG. 1, it will be observed that the center line 101 of the square hole 18 lies in the same plane as the centerline 102 of the mounting bolt hole 39. Thus, when the locking device 43 has been mounted and the ratchet pin 5 inserted to the point where the ratchet shank 41 is engaged by the ratchet stop 6, access to the mounting bolt 29 is precluded. FIG. 2 shows in perspective how the ratchet shank blocks access to the mounting bolt. Because the ratchet pin 5 cannot be withdrawn except by operaion of the key lock 8, unauthorized removal of the locking device 43 from the vehicle is prevented whether or not the pin 5 is utilized to append a helmet.

Referring again to FIG. 1, the detailed operation of the lock mechanism is as follows. (The actual lock unit 8 is illustrated as a key lock, although it is understood that a combination lock might also be employed.) Extending through the stem of the Y shaped casing 1 is a cylindrical hole having first: a large diameter 74 for housing the rotary barrel 103 of the key lock unit 8; a second smaller diameter 75 which contains a moveable piston 70 and a spring bias 7; and a third somewhat smaller diameter 76 which acts as a bearing and guide for the piston stem 71. A bearing pin 72 connects the piston stem 71 with the ratchet stop 6 which is pivotally supported at 73 within the hollow chamber 78 of the casing 1. With the barrel 103 of the key lock unit 8 in the position shown (the locked state) the ratchet pin 5 may be inserted into the square hole 8 in the direction of the arrow 79, the compression spring 7 thus yielding to permit the stop 6 to rotate about the pin 73 as the edge 80 of the stop 6 is pushed aside by the ramp 81 of each tooth. Withdrawal of the pin 5 from any point is of course prevented by the shoulder 80 of the stop engaging the shoulder 13 of a tooth.

In order to release the pin 5, the key 85 is inserted to disengage the tumblers 110 from the notch 111 and the barrel 103 is rotated. Because the faces 98 and 99 of barrel extension 77 and piston 70 are diagonally beveled, any rotation of the barrel 103 relative to the piston 70 will cause the piston to be displaced in the direction of the arrow 90 so as to cause the shoulder 80 of the stop 6 to disengage the ratchet teeth 13. For example, when the barrel is rotated 180 degrees the point 91 on the barrel extension 77 will move to the point 92 thus displacing the piston a distance 93 on the drawing, causing the stop to be retracted to the posiion shown as 94 which will allow free removal of the pin 5.

Once the pin 5 is removed the helmet may be locked by inserting the shank 41 of the pin 5 first through a helmet hole 11 and then back into the square aperture 18 so as to suspend the helmet 10 by the head 12 in the manner shown in FIG. 3. Alternatively, the locking unit may be mounted "upside down" so as to permit locking the helmet above the handlebar if desired, it being understood that there are several mounting configurations possible with the aid of a pin having a longer shank than the one illustrated in the drawings.

As shown in FIG. 1, the barrel 103 of the lock unit is held within the casing by the lips 120 which must naturally be fashioned into shape after the barrel has been inserted. Alternatively, the barrel 103 may be retained by other means, as for axample an expanding snap ring may be utilized to engage accordant grooves in cylinder and barrel to prevent removal of the barrel once it has been inserted.

It will be apparent that the present invention is not limited in its application to the securing of headgear, and that it may be employed to lock numerous other articles such as face masks, tool kits, etc. which have an existing hole or which can be modified to have a small hole through which a fastening pin might be inserted.

It is recognized that there are means other than the ratchet and stop for securing the pin in the locking device. So too, are there other ways or arranging the casing and positioning of the locking unit relative to the clamp, and other clamping means. Thus, although a preferred embodiment of the invention has been shown and described herein, it is understood that the invention is not limited thereto and that numerous changes and substitutions may be made without departing from the spirit of the invention.

We claim:

1. An apparatus for locking a safety helmet to an open vehicle comprising: a casing for housing a locking unit; a clamp having a pair of cheek members adapted to be tightened about some structural member of an open vehicle; means for tightening said cheek members about some structural member of an open vehicle; a detachable pin having a head for suspending a helmet adapted to have a hole to accommodate the shank of said pin, the shank of said pin having a row of serrated teeth to form a ratchet bar; means responsive to said locking unit for temporarily securing said pin to said casing.

2. The apparatus described in claim 1 wherein said casing comprises: a Y-shaped structure having a first opening adapted to receive said ratchet shanked pin, said hole being located to prevent access to said clamp tightening means when said ratchet pin is inserted in said hole; said Y-shaped structure having a second opening of cylindrical shape extending longitudinally through the stem of said Y-shaped structure; said casing having a notch along one wall of said cylindrical opening for engaging locking tumblers.

3. The apparatus described in claim 2 wherein said locking unit comprises: a cylindrical rotary barrel extending longitudinally through said cylindrical casing opening at one end thereof, said rotary barrel having tumblers responsive to a key for engaging or disengaging said notch in said cylindrical wall whereby said rotary barrel may be locked to prevent rotation with respect to said casing or unlocked to allow rotation of said barrel within said casing.

4. The apparatus described in claim 3 wherein said means responsive to said locking unit for temporarily securing said detachable pin to said casing comprises: a ratchet stop within said first opening in said Y-shaped structure; bias means for urging said ratchet stop to engage said ratchet shank to prevent the removal of said ratchet pin from said first opening whereby said casing may be interlocked with a vehicle and helmet; a barrel extension integrally connected with said rotary barrel, said barrel extension having its outermost end surface oblique to the axis of barrel rotation; a moveable piston positioned within said cylindrical second opening in said housing to have its head in contact with said oblique surface of said barrel extension; said piston having its head surface oblique to match said oblique surface of said barrel extension; biasing means for urging said piston against said barrel extension to keep said oblique surfaces in contact; restraining means for preventing piston rotation whereby said piston may be translated in said cylindrical opening when said rotating barrel is rotated with respect to said casing; linkage means for connecting said piston with said ratchet stop whereby said ratchet stop may be moved to disengage said ratchet shank when said barrel is rotated to allow removal of said pin and helmet.

5. An apparatus for locking a safety helmet having a hole to an open vehicle comprising: a movable member adapted to pass through a helmet hole; a casing having a locking unit; a concave recess in said casing to form the first cheek of a clamp; a second member hinged to said casing, said second member having a concave recessed face to form the second cheek of a clamp; means for attaching the free end of said hinged member and said casing together about a structural part of an open vehicle; means responsive to said locking unit for securing said movable member so as to interlock said casing, helmet and vehicle.

6. An apparatus for locking a safety helmet having a hole to an open vehicle comprising: a movable member having a portion adapted to pass through the helmet hole; a casing having a locking unit; a concave recess in said casing to form the first cheek of a clamp; a second member having a concave face to form the second cheek of a clamp; means for attaching said casing and said second member together about a structural part of an open vehicle; means responsive to said locking unit for securing said movable member with said casing so as to preclude access to said means for attaching said casing and said second member together whereby said casing, helmet and vehicle may be interlocked.

7. An apparatus for temporarily locking a safety helmet to an open vehicle comprising: a casing having a locking unit; means for attaching said casing to an open vehicle; a ratchet shanked pin having a head for appending a helmet through an opening in the helmet of size sufficient to permit passage of the pin shank only; and means responsive to said locking unit for locking said ratchet shanked pin to said casing so as to prevent the unauthorized removal of said locking unit, casing and helmet from the vehicle to which said casing is attached.

8. The apparatus described in claim 7 wherein said means for attaching said casing to an open vehicle comprises: a concave recessed face in said casing forming the first cheek of a clamp; an arm adjacent to said first cheek and pivotally connected at one end to said casing; said arm having a concave recessed face forming the second cheek of a clamp; means for tightening the free end of said arm to said casing to bring said first and second cheeks together so as to form a pressure clamp about some structural part of an open vehicle.

9. An apparatus for temporarily locking a safety helmet to an open vehicle comprising: a casing having a locking unit; means for attaching said casing to an open vehicle; a detachable member adapted to append a helmet; means responsive to said locking unit for locking said detachable member to said casing so as to obstruct access to said means for attaching said casing to an open vehicle whereby the removal of said detachable member from said casing and the removal of said casing from the vehicle to which it is attached may be prevented.

10. The combination comprising: a locking pin; a safety helmet having a locking hole adapted to pass the shank of said locking pin; a locking device having an opening adapted to receive the shank of said locking pin; means for rigidly attaching said locking device to an open vehicle; means for locking said pin in the opening in said locking device and means for locking said locking device on the vehicle to which it is attached.

11. The apparatus described in claim 10 wherein said means for attaching said locking device on the vehicle comprises: a clamp having complementary recessed cheeks, and adjustment means for tightening the clamp cheeks about some part of the vehicle.

12. The apparatus described in claim 11 wherein said adjustment means for tightening the clamp comprises: a bolt positioned adjacent to a pin shank opening in said locking device and oriented to have its center axis intersecting the axis of the pin shank opening so as to obstruct access to said bolt when said locking pin is inserted in the locking device opening whereby said locking device will be locked to said vehicle when said pin is locked in said locking device.

References Cited

UNITED STATES PATENTS

| | | | |
|---|---|---|---|
| 995,411 | 6/1911 | Morrill | 248—226 |
| 1,547,065 | 7/1925 | Noble | 248—230 X |
| 2,406,029 | 8/1946 | Netteshiem | 248—230 |
| 3,436,936 | 4/1969 | Locker | 70—59 |

FOREIGN PATENTS

| | | |
|---|---|---|
| 1,037,495 | 4/1953 | France. |
| 367,725 | 4/1963 | Switzerland. |

RICHARD E. MOORE, Primary Examiner

E. J. McCARTHY, Assistant Examiner

U.S. Cl. X.R.

2—6